(12) United States Patent
Kimura et al.

(10) Patent No.: US 9,982,116 B2
(45) Date of Patent: May 29, 2018

(54) TIRE RUBBER COMPOSITION AND PNEUMATIC TIRE

(71) Applicant: THE YOKOHAMA RUBBER CO., LTD., Minato-Ku, Tokyo (JP)

(72) Inventors: Kazushi Kimura, Hiratsuka (JP); Hirokazu Kageyama, Hiratsuka (JP); Satoshi Mihara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days. days.

(21) Appl. No.: 15/557,618

(22) PCT Filed: Mar. 18, 2016

(86) PCT No.: PCT/JP2016/058698
§ 371 (c)(1),
(2) Date: Sep. 12, 2017

(87) PCT Pub. No.: WO2016/148278
PCT Pub. Date: Sep. 22, 2016

(65) Prior Publication Data
US 2018/0044510 A1 Feb. 15, 2018

(30) Foreign Application Priority Data
Mar. 18, 2015 (JP) .................. 2015-054173

(51) Int. Cl.
*C08L 9/00* (2006.01)
*B60C 1/00* (2006.01)
*C08L 9/06* (2006.01)

(52) U.S. Cl.
CPC ............. *C08L 9/06* (2013.01); *B60C 1/0016* (2013.01); *C08L 9/00* (2013.01); *C08L 2205/14* (2013.01); *C08L 2205/22* (2013.01)

(58) Field of Classification Search
CPC .............................. C08L 9/00; C08L 2205/22
See application file for complete search history.

(56) References Cited

U.S. PATENT DOCUMENTS 9,493,637 B2 * 11/2016 Maejima ................. C08C 19/34
2016/0237253 A1 * 8/2016 Kakubo .................. B60C 11/14

FOREIGN PATENT DOCUMENTS

| JP | H08-151482 A | 6/1996 | |
| JP | 2002-097303 A | 4/2002 | |
| JP | 2010-090203 A | 4/2010 | |
| JP | 2012-036268 A | 2/2012 | |
| JP | 2012-211316 A | 11/2012 | |
| JP | 2013-224355 A | 10/2013 | |
| JP | 2014-062168 A | 4/2014 | |
| JP | 2015-067636 A | 4/2015 | |
| WO | WO-2012144605 A1 * | 10/2012 | ............. C08C 19/34 |

* cited by examiner

*Primary Examiner* — Vickey Nerangis
(74) *Attorney, Agent, or Firm* — Carrier Blackman & Associates, P.C.; Joseph P. Carrier; Fulchand P. Shende

(57) ABSTRACT

Provided are a tire rubber composition capable of producing a pneumatic tire having excellent rigidity and wear resistance and a pneumatic tire using the same. The tire rubber composition includes 100 parts by mass of a diene rubber (A) and from 1 to 50 parts by mass of elastic microparticles (B), wherein the elastic microparticles (B) have a form of microparticles obtained by crosslinking a crosslinkable oligomer or polymer (b1) in water or an organic solvent, or in the diene rubber (A), and have an average particle size of from 0.001 to 100 μm, the JIS A hardness of a cured product obtained by crosslinking the crosslinkable oligomer or polymer (b1) without use of water, the organic solvent or the diene rubber (A) is greater than 45, and the elongation of the cured product is 200% or greater.

14 Claims, 1 Drawing Sheet

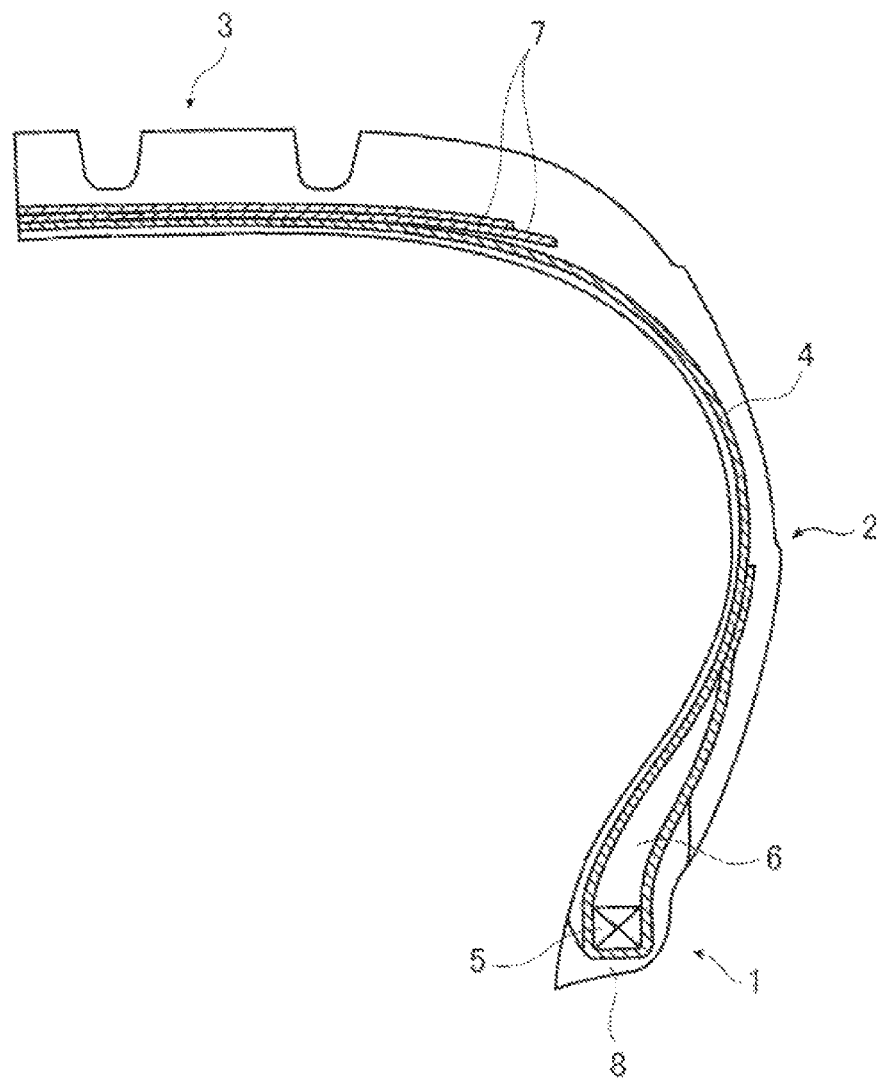

TIRE RUBBER COMPOSITION AND PNEUMATIC TIRE

TECHNICAL FIELD

The present invention relates to a tire rubber composition and a pneumatic tire.

BACKGROUND ART

Conventionally, improving fuel efficiency of a vehicle has been carried out by reducing the rolling resistance of a tire and suppressing generation of heat. Among tire members, a tread having a high occupancy in a tire is required to have excellent low heat build-up.

In order to solve the problems, silica is recently used as a reinforcing filler for the tread of the tire.

However, since the affinity of silica with rubber is lower than that of carbon black, a reinforcing effect is low.

In order to achieve the same reinforcing property as that of carbon black, the reinforcing property is tried to be increased by improving the dispersibility of silica or chemically bonding rubber to silica. Specifically, addition of a silane coupling agent and use of terminal-modified SBR for silica have been investigated.

As a method of satisfying the low heat build-up, a method in which the amount of silica to be mixed as a reinforcing filler is decreased and a method using a filler having low reinforcing property are known. However, the methods have problems of largely decreasing wear resistance performance and grip performance.

In order to solve the problems, for example, Patent Document 1 proposes "a rubber composition for tire treads including (A) a diene rubber containing a vinyl group, (B) silica having a nitrogen adsorption specific surface area of from 30 to 500 $m^2/g$ and/or carbon black having a nitrogen adsorption specific surface area of from 22 to 250 $m^2/g$, and (C) unvulcanized composite microparticles containing a compound having two or more mercapto groups in the molecule" (claim 1).

CITATION LIST

Patent Literature

Patent Document 1: JP-A-2010-090203

SUMMARY OF INVENTION

Technical Problem

However, the present inventors have investigated the rubber composition described in Patent Document 1, and revealed that a tire formed from the rubber composition has lower rigidity and wear resistance.

Therefore, an object of the present invention is to provide a tire rubber composition capable of producing a pneumatic tire having excellent rigidity and wear resistance and a pneumatic tire using the same.

Solution to Problem

The present inventors have intensively investigated to solve the problems, and as a result, found that when elastic microparticles which have a microparticle form obtained by crosslinking a crosslinkable oligomer or polymer capable of satisfying predetermined hardness and elongation during curing of the oligomer or polymer alone in an organic solvent or water or in a diene rubber are compounded, a pneumatic tire having excellent rigidity and wear resistance can be produced. The present invention has been completed.

Specifically, the inventors have found that the problems described above can be solved by the following features.

1. A tire rubber composition containing 100 parts by mass of diene rubber (A) and from 1 to 50 parts by mass of elastic microparticles (B), wherein:
   the elastic microparticles (B) have a microparticle form obtained by crosslinking a crosslinkable oligomer or polymer (b1) in water or an organic solvent, or in the diene rubber (A), and have an average particle size of from 0.001 to 100 µm;
   the JIS A hardness of a cured product obtained by crosslinking the crosslinkable oligomer or polymer (b1) without use of water, the organic solvent or the diene rubber (A) is greater than 45, and the elongation of the cured product is 200% or greater.
2. The tire rubber composition according to 1, wherein the elastic microparticles (B) contain a component containing a sulfur atom.
3. The tire rubber composition according to 1 or 2, wherein the elastic microparticles (B) have a composite structure composed of a component compatible with the diene rubber (A) and a component incompatible with the diene rubber (A).
4. The tire rubber composition according to any one of 1 to 3, further containing a carbon black and/or a white filler (C) in an amount of from 1 to 100 parts by mass relative to 100 parts by mass of the diene rubber (A).
5. The tire rubber composition according to any one of 1 to 4, wherein the elastic microparticles (B) are microparticles obtained by crosslinking the crosslinkable oligomer or polymer (b1) in a dispersion including water or the organic solvent as a dispersion medium to form microparticles, removing the dispersion medium, and forming a powder.
6. The tire rubber composition according to any one of 1 to 5, wherein the elastic microparticles (B) are microparticles obtained by crosslinking the crosslinkable oligomer or polymer (b1) in the diene rubber (A) and forming microparticles.
7. A pneumatic tire including a tire tread formed using the tire rubber composition described in any one of 1 to 6.

Advantageous Effects of Invention

As shown below, the present invention can provide a tire rubber composition capable of producing a pneumatic tire having excellent rigidity and wear resistance and a pneumatic tire using the tire rubber composition.

BRIEF DESCRIPTION OF DRAWINGS

FIG. 1 is a schematic partial cross-sectional view of a tire illustrating one example of an embodiment of a pneumatic tire of the present invention.

DESCRIPTION OF EMBODIMENTS

Tire Rubber Composition

The tire rubber composition of the present invention is a tire rubber composition including 100 parts by mass of a diene rubber (A) and from 1 to 50 parts by mass of elastic microparticles (B), wherein the elastic microparticles (B) have a microparticle form obtained by crosslinking a crosslinkable oligomer or polymer (b1) in water or an organic solvent or in the diene rubber (A), and have an average particle size of from 0.001 to 100 µm, the JIS A hardness of a cured product obtained by crosslinking the crosslinkable oligomer or polymer (b1) without use of water, the organic solvent or the diene rubber (A) is greater than 45, and the elongation of the cured product is 200% or greater.

Herein, "the JIS A hardness of a cured product obtained by crosslinking the crosslinkable oligomer or polymer (b1) without use of water, the organic solvent or the diene rubber (A) is greater than 45, and the elongation of the cured product is 200% or greater" is a specification concerning the elastic microparticles (B) contained in the tire rubber composition of the present invention. However, it is difficult to measure the hardness and elongation of the microparticles themselves. Therefore, the hardness and elongation are specified as the hardness and elongation of the cured product (in a bulk state) formed from the same component as the component forming the elastic microparticles (B).

The "JIS A hardness" represents a durometer hardness specified in JIS K6253-3:2012, which is measured at a temperature of 25° C. by a type A durometer.

The "elongation" represents elongation at break (EB) [%] which is measured at a temperature of 25° C. by cutting out the cured product into a JIS No. 3 dumbbell-shaped test piece and carrying out a tensile test at a tensile speed of 500 mm/min in accordance with JIS K6251:2010.

In the present invention, when the rubber composition containing the elastic microparticles (B) is used as described above, the rigidity and wear resistance of the pneumatic tire are favorable.

Although the reason is not clear in detail, it is assumed to be as follows.

Specifically, when the elastic microparticles (B) formed from a cured product having predetermined hardness and elongation in a form of microparticles are used, a matrix rubber is reinforced, and additionally, a locally applied strain is dispersed. Therefore, it is conceived that the rigidity and the wear resistance are improved.

Hereinafter, each component contained in the tire rubber composition of the present invention will be described in detail.

Diene Rubber (A)

The diene rubber (A) contained in the tire rubber composition of the present invention is not particularly limited as long as it has a double bond in the main chain. Specific examples thereof include a natural rubber (NR), an isoprene rubber (IR), a butadiene rubber (BR), an acrylonitrile-butadiene rubber (NBR), a styrene-butadiene rubber (SBR), a styrene-isoprene rubber (SIR), and a styrene-isoprene-butadiene rubber (SIBR). One type of the diene rubber may be used alone, or two or more types thereof may be used in combination.

Further, the diene rubber (A) may be a derivative formed by modifying a terminal or side chain of each of the rubbers described above with an amino group, an amide group, a silyl group, an alkoxy group, a carboxy group, a hydroxy group, an epoxy group, or the like.

Among these, NR, BR, or SBR is preferably used, and SBR is more preferably used.

In the present invention, the content of SBR is preferably 50 mass% or greater, and more preferably from 70 to 100 mass of the diene rubber (A) since the rigidity and wear resistance of a tire to be produced are more favorable and the gripability and the low rolling resistance are also favorable.

Elastic Microparticles (B)

The elastic microparticles (B) contained in the tire rubber composition of the present invention have a form of microparticles obtained by crosslinking the crosslinkable oligomer or polymer (b1) in water or the organic solvent, or in the diene rubber (A).

The average particle size of the elastic microparticles (B) is from 0.001 to 100 µm, preferably from 0.01 to 50 µm, and more preferably from 0.05 to 30 µm.

Herein, the "average particle size" of the elastic microparticles (B) refers to a value obtained by measuring the longest lengths of any 10 or greater particles in the elastic microparticles (B) which are observed in image analysis of cross section of a vulcanized test sample of the tire rubber composition by an electron microscope (magnification: from about 500 to 2000), and averaging the measured values.

Crosslinkable Oligomer or Polymer (b1)

The crosslinkable oligomer or polymer (b1) constituting the elastic microparticles (B) is not particularly limited as long as it is an oligomer or polymer having a crosslinkable functional group. Examples thereof include polyether-based, polyester-based, polyolefin-based, polycarbonate-based, aliphatic, saturated hydrocarbon-based, acrylic, plant-derived, and siloxane-based polymers and copolymers.

Among these, the polyether-based and polycarbonate-based copolymers are preferable, and the polycarbonate-based copolymer is more preferable since a tough urethane rubber can be produced.

Examples of the polycarbonate-based copolymer include those obtained by a transesterification reaction of dialkyl carbonate and a polyol compound (e.g., 1,6-hexanediol, 1,4-butanediol, and 1,5-pentanediol); and those obtained by a condensation reaction of polycarbonate diol and a diisocyanate compound (e.g., 2,4-tolylene diisocyanate, 2,6-tolylene diisocyanate, 4,4'-diphenylmethane diisocyanate, and 2,4'-diphenylmethane diisocyanate) (hereinafter also abbreviated as "polycarbonate urethane prepolymer").

Specific examples of the crosslinkable functional group in the crosslinkable oligomer or polymer (b1) include a hydroxyl group, a hydrolyzable silyl group, a silanol group, an isocyanate group, a (meth)acryloyl group, an allyl group, a carboxy group, an acid anhydride group, and an epoxy group.

Among these, it is preferable that a hydrolyzable silyl group or an acid anhydride group be contained since wear resistance of the pneumatic tire to be produced is more favorable.

Note that "(meth)acryloyloxy group" herein refers to an acryloyloxy group ($CH_2$=CHCOO—) or a methacryloyloxy group ($CH_2$=C($CH_3$)COO—).

In the present invention, it is preferable that the elastic microparticles (B) contain a component containing a sulfur atom since the rigidity of the pneumatic tire to be produced is further improved by chemical bonding to the diene rubber (A).

Herein, an aspect in which the elastic microparticles (B) contain the component containing a sulfur atom includes, for example, an aspect in which a component having a mercapto group or a sulfide bond is present via a covalent bond in the inside or on the surface of the elastic microparticles (B).

Among the aspects, the aspect in which a mercapto group or a sulfide bond is present on the surface of the elastic microparticles (B) is preferable.

Herein, examples of a method of introducing a mercapto group or a polysulfide bond into the surface of the elastic microparticles (B) include, as shown in synthesis example of examples described below, a method in which a diisocyanate compound is added to a hydroxy group-containing oligomer such as polytetramethylene ether glycol, polycarbonate diol, a hydroxy group-containing polyisoprene, or a hydroxy group-containing polybutadiene, to synthesize an isocyanate group-containing urethane prepolymer, a compound having a (meth)acryloyloxy group and a hydroxy group (e.g., hydroxy acrylate and hydroxy methacrylate) is reacted with the urethane prepolymer, and a polyfunctional thiol compound is then introduced into the (meth)acryloyloxy group in the synthesized product after the reaction by an addition reaction of ene-thiol reaction.

Other examples of the method include a method in which a compound having a (meth)acryloyloxy group and a hydroxy group (e.g., 2-isocyanatoethyl methacrylate and 2-isocyanatoethyl acrylate) is reacted with a hydroxy group-containing oligomer such as polytetramethylene ether glycol, polycarbonate diol, a hydroxy group-containing polyisoprene, or a hydroxy group-containing polybutadiene, and a polyfunctional thiol compound is then introduced by an addition reaction of ene-thiol reaction.

Other examples of the method include a method in which isocyanate silane or the like is added to a hydroxy group-containing oligomer such as polytetramethylene ether glycol, polycarbonate diol, a hydroxy group-containing polyisoprene, or a hydroxy group-containing polybutadiene, to introduce a hydrolyzable silyl group, and a sulfur-containing silane coupling agent such as a mercaptosilane, a sulfursilane, or polysulfidesilane is added at the same time as a reaction and curing due to silanol condensation for crosslinking of the silyl group.

In the present invention, it is preferable that the elastic microparticles (B) have a composite structure composed of a component compatible with the diene rubber (A) and a component incompatible with the diene rubber (A) since the dispersibility in and compatibility with the diene rubber (A) are excellent.

Examples of the composite structure include a core-shell structure of a core and a shell composed of different polymers; a structure in which a microparticle formed from a polymer is coated with another polymer; and a structure in which a microparticle is formed by copolymerization of two or more types of oligomers or polymers.

It is preferable that a part constituting the outer side of the particles in the composite structure contain the component containing a sulfur atom.

It is preferable that the elastic microparticles (B) be microparticles obtained by forming microparticles from the crosslinkable oligomer or polymer (b1) in a dispersion including water or an organic solvent (e.g., MEK, MIBK, butyl cellosolve, and cyclohexanone) as a dispersion medium, removing the dispersion medium, and forming a powder since a uniform form is easily obtained.

It is preferable that the elastic microparticles (B) be prepared using an additive such as a surfactant, an emulsifier, a dispersant, or a silane coupling agent during formation of microparticles in the dispersion.

It is preferable that the elastic microparticles (B) be an aspect in which the crosslinkable oligomer or polymer (b1) is formed into microparticles in the diene rubber (A) since the uniform form is easily obtained.

In the present invention, the JIS A hardness of the cured product obtained by crosslinking the crosslinkable oligomer or polymer (b1) as described above is greater than 45 and the elongation of the cured product is 200% or greater.

The JIS A hardness of the cured product is preferably 60 or greater, and more preferably 75 or greater.

The elongation of the cured product is preferably 250% or greater, and more preferably 300% or greater.

In the present invention, the content of the elastic microparticles (B) is from 1 to 50 parts by mass, preferably from 5 to 40 parts by mass, and more preferably from 10 to 30 parts by mass, per 100 parts by mass of the diene rubber (A).

Carbon Black and/or White Filler (C)

The tire rubber composition of the present invention contains a carbon black and/or a white filler (C).

Carbon Black

Specific examples of the carbon black include furnace carbon blacks such as SAF, ISAF, HAF, FEF, GPF, and SRF. One type of the carbon black may be used alone, or two or more types thereof may be used in combination.

Moreover, the nitrogen adsorption specific surface area ($N_2SA$) of the carbon black is preferably from 10 to 300 $m^2/g$, and more preferably from 20 to 200 $m^2/g$ from the viewpoint of processability during mixing of the rubber composition, reinforcing property of the pneumatic tire, and the like.

Note that the $N_2SA$ is a value of the amount of nitrogen adsorbed to a surface of carbon black, measured in accordance with JIS K6217-2:2001, "Part 2: Determination of specific surface area—Nitrogen adsorption methods—Single-point procedures."

White Filler

Specific examples of the white filler include silica, calcium carbonate, magnesium carbonate, talc, clay, alumina, aluminum hydroxide, titanium oxide, and calcium sulfate. One type of the white filler may be used alone, or two or more types thereof may be used in combination.

Of these, silica is preferable from the viewpoint of reinforcing property.

Specific examples of the silica include wet silica (hydrous silicic acid), dry silica (silicic anhydride), calcium silicate, and aluminum silicate. One type of these may be used alone, or two or more types thereof may be used in combination.

Of these, wet silica is preferable from the viewpoint of balance of rolling resistance, grip performance, wear resistance, and the like.

It is preferable that the silica have a CTAB adsorption specific surface area of from 50 to 300 $m^2/g$ from the viewpoint of kneading property.

Note that the CTAB adsorption specific surface area is a value of the amount of n-hexadecyltrimethylammonium bromide adsorbed to the surface of silica measured in accordance with JIS K6217-3:2001 "Part 3: Method for determining specific surface area—CTAB adsorption method."

In the present invention, the content of the carbon black and/or the whit filler (C) is from 1 to 100 parts by mass, preferably from 40 to 90 parts by mass, and more preferably from 45 to 80 parts by mass, per 100 parts by mass of the diene rubber (A).

Herein, the content of the carbon black and/or the white filler (C) means the content of the carbon black when only carbon black is contained. The content of the carbon black and/or the white filler (C) means the content of the white filler when only the white filler is contained. The content of the carbon black and/or the white filler (C) means the total content of the carbon black and the white filler when the carbon black and the white filler are contained.

Silane Coupling Agent

When the tire rubber composition of the present invention contains the white filler (especially, silica), it is preferable that the tire rubber composition contain a silane coupling agent from the viewpoint of improving the reinforcing performance of the tire.

When the silane coupling agent is compounded, the content thereof is preferably from 0.1 to 20 parts by mass, and more preferably from 4 to 12 parts by mass, per 100 parts by mass of the white filler.

Specific examples of the silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylpropyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, 3-triethoxysilylpropylbenzothiazole tetrasulfide, 3-triethoxysilylpropylmethacrylate monosulfide, 3-trimethoxysilylpropylmethacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, and dimethoxymethylsilylpropylbenzothiazole tetrasulfide. One type of the silane coupling agent may be used alone, or two or more types thereof may be used in combination.

Of these, bis-(3-triethoxysilylpropyl)tetrasulfide and/or bis-(3-triethoxysilylpropyl)disulfide is preferably used from the viewpoint of improving reinforcing property. Specific examples thereof include Si69 (bis-(3-triethoxysilylpropyl)tetrasulfide; manufactured by Evonik Degussa), and Si75 (bis-(3-triethoxysilylpropyl)disulfide; manufactured by Evonik Degussa).

Other Components

In addition to the components described above, the tire rubber composition of the present invention may include various types of other additives which are generally used in the tire rubber composition, such as fillers such as calcium carbonate; chemical foaming agents such as dinitrosopentamethylenetetramine (DPT), azodicarbonamide (ADCA), dinitrosopentastyrenetetramine, oxybisbenzenesulfonylhydrazide (OBSH), a benzenesulfonylhydrazide derivative, ammonium bicarbonate, ammonium carbonate, and sodium bicarbonate, which generate carbon dioxide, and toluenesulfonylhydrazide, P-toluenesulfonylsemicarbazide, a nitrososulfonyl azo compound, N,N'-dimethyl-N,N'-dinitrosophthalamide, and P,P'-oxy-bis(benzenesulfonylsemicarbazide), which generate nitrogen; vulcanizing agents such as sulfur; sulfenamide-based, guanidine-based, thiazole-based, thiourea-based, and thiuram-based vulcanization accelerators; vulcanization accelerator aids such as zinc oxide and stearic acid; waxes; aroma oils; anti-aging agents; and plasticizers.

The amounts of these additives to be compounded may be conventional general amounts as long as the object of the present invention is not impaired. For example, the sulfur may be compounded in an amount of from 0.5 to 5 parts by mass, the vulcanization accelerator may be mixed in amount of from 0.1 to 5 parts by mass, the vulcanization accelerator aid may be compounded in amount of from 0.1 to 10 parts by mass, the anti-aging agent may be compounded in amount of from 0.5 to 5 parts by mass, the wax may be compounded in amount of from 1 to 10 parts by mass, and the aroma oil may be compounded in amount of from 5 to 30 parts by mass, per 100 parts by mass of the diene rubber (A).

Method of Producing Tire Rubber Composition

There are no particular limitations to the method of producing the tire rubber composition of the present invention, and examples thereof include a method in which each of the components is kneaded using a publicly known method and device (such as a Banbury mixer, kneader, or roll).

Furthermore, the tire rubber composition of the present invention can be vulcanized or crosslinked under conventionally known vulcanizing or crosslinking conditions.

Pneumatic Tire

The pneumatic tire of the present invention is a pneumatic tire using the tire rubber composition of the present invention described above in a tire tread.

FIG. 1 is a schematic partial cross-sectional view of a tire that illustrates one example of embodiment of the pneumatic tire of the present invention, but the tire of the present invention is not limited to the embodiment illustrated in FIG. 1.

In FIG. 1, reference sign 1 denotes a bead portion, reference sign 2 denotes a sidewall portion, and reference sign 3 denotes a tread portion formed from the tire rubber composition of the present invention.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire periphery of the tire on the outer side of the carcass layer 4.

Additionally, rim cushions 8 are provided in parts of the bead portions 1 that are in contact with a rim.

The pneumatic tire of the present invention can be produced by, for example, forming a tire tread portion by vulcanization or crosslinking at a temperature corresponding to the type and compounding ratio of the diene rubber, vulcanizing agent, or crosslinking agent, and vulcanization or crosslinking accelerator used in the tire rubber composition of the present invention.

EXAMPLES

Preparation of Elastic Microparticles 1

200 g of polycarbonate diol (T6001 manufactured by Asahi Kasei Corporation) and 100 g of 4,4'-diphenylmethane diisocyanate (MILLIONATE MT, manufactured by Nippon Polyurethane Industry Co., Ltd.) were reacted at 80° C. for 5 hours, to obtain an isocyanate-terminated polycarbonate urethane prepolymer (reactant 1).

Separately, to the reactant 1, 20 g of trimethylolpropane (TMP manufactured by MITSUBISHI GAS CHEMICAL COMPANY, INC.), 20 g of methyl isobutyl ketone (hereinafter abbreviated as "MIBK"), and 23 g of 2-isocyanateethyl methacrylate (Karenz MOI (trade name), manufactured by Showa Denko K.K.) were mixed and reacted at 80° C. for 10 hours, to obtain a reactant (reactant 2).

Subsequently, 5 g of MIBK, 2.2 g of dimethylolbutanoic acid (DMBA), 1.1 g of triethylamine (TEA), and 6.1 g of the reactant 2 were mixed in 50 g of urethane prepolymer (the reactant 1), and the mixture was stirred for 10 minutes.

Next, 5.0 g of sorbitanic acid-based surfactant (TW-0320V, manufactured by Kao Corporation), 8.5 g of pentaerythritoltetrakis(3-mercaptobutyrate), and 0.06 g of dibutyltin dilaurate (DBTL) were added to 80 g of water, and the mixture was stirred by a high-speed dissolver-type stirrer at a rotational speed of 1000 rpm for 10 minutes. Thereafter, the mixture was gradually warmed to 70° C., and continuously stirred for 1 hour, to obtain a milky white emulsion solution.

The obtained solution was applied to a glass plate, and observed by a laser microscope after evaporation of water. Production of spherical elastic microparticles 1 was observed.

The average particle size of the obtained elastic microparticles 1 was about 10 μm.

A cured product obtained by curing the same components as those of the elastic microparticles 1 had a JIS A hardness of 80, a strength of 40 MPa, and an elongation of 300%.

Preparation of Elastic Microparticles 2

100 g of polycarbonate diol (T6001 manufactured by Asahi Kasei Corporation), 43.5 g of 4,4'-diphenylmethane diisocyanate (MILLIONATE MT, manufactured by Nippon Polyurethane Industry Co., Ltd.), and 70 g of MIBK were reacted at 80° C. for 5 hours, to obtain an isocyanate-terminated polycarbonate urethane prepolymer (reactant 3).

Separately to the reactant 3, 27 g of trimethylolpropane (TMP manufactured by MITSUBISHI GAS CHEMICAL COMPANY, INC.), 41 g of γ-isocyanate propyltrimethoxysilane (Y-5187, manufactured by Momentive Performance Materials Inc.), and 20 g of MIBK were mixed and reacted at 80° C. for 10 hours, to obtain a reactant 4.

Subsequently, 10 g of MIBK, 5.0 g of dimethylolbutanoic acid (DMBA), 3.0 g of triethylamine (TEA), and 2.5 g of trimethylolpropane (TMP, manufactured by MITSUBISHI GAS CHEMICAL COMPANY, INC.) were added to 210 g of urethane prepolymer (the reactant 3), and the mixture was stirred for 5 minutes. Thereafter, 200 g of water and 5.0 g of sorbitanic acid-based surfactant (TW-0320V, manufactured by Kao Corporation) were added, and the mixture was stirred by a stirrer equipped with a dissolver at a dissolver rotational speed of 1000 rpm for 10 minutes.

Subsequently, 100 g of urethane prepolymer (the reactant 1) used in preparation of the elastic microparticles 1, 100 g of MIBK, and 16 g of the reactant 4 were added and the mixture was stirred for 5 minutes. Thereafter, 10 g of 3-mercapto propyltrimethoxysilane (KBM-803, manufactured by Shin-Etsu Chemical Co., Ltd.) and 15.0 g of sorbitanic acid-based surfactant (TW-0320V, manufactured by Kao Corporation) were added and immediately stirred at a dissolver rotational speed of 1000 rpm for 30 minutes. The resultant was then allowed to stand at 70° C. for 1 hour, to obtain a milky white emulsion solution.

The obtained solution was applied to a glass plate, and observed by a laser microscope after evaporation of water. Production of rod-shaped elastic microparticles 2 was observed.

The average particle size of the obtained elastic microparticles 2 was about 20 μm.

A cured product obtained by curing the same components as those of the elastic microparticles 2 had a JIS A hardness of 60, a strength of 30 MPa, and an elongation of 250%.

Preparation of Elastic Microparticles 3

30 g of MIBK, 1.7 g of dimethylolbutanoic acid (DMBA), and 1.3 g of triethylamine (TEA) were added to 33 g of urethane prepolymer (the reactant 1) used in preparation of the elastic microparticles 1, and the mixture was stirred for 5 minutes.

Subsequently, 80 g of water and 4.0 g of sorbitanic acid-based surfactant (TW-0320V, manufactured by Kao Corporation) were added and stirred by a stirrer equipped with a dissolver at a dissolver rotational speed of 1000 rpm for 10 minutes. The temperature was then increased to 70° C. and the state was maintained for 30 minutes.

Next, 10 g of hydroxyl group-terminated liquid polyisoprene Poly ip (manufactured by Idemitsu Kosan Co., Ltd.) and 2.2 g of the reactant 2 prepared for the elastic microparticles 1 were added, and the mixture was continuously stirred at 70° C. for 3 minutes.

Subsequently, 4.0 g of pentaerythritoltetrakis(3-mercaptobutyrate) and 0.1 g of dibutyltin dilaurate (DBTL) were added, and the mixture was stirred by a high-speed dissolver-type stirrer at a rotational speed of 1000 rpm for 10 minutes. Thereafter, the mixture was continuously stirred for 1 hour while the temperature was maintained at 70° C., to obtain a milky white emulsion solution.

The obtained solution was applied to a glass plate, and observed by a laser microscope after evaporation of water. Production of spherical elastic microparticles 3 was observed. It was found that the average particle size thereof was about 10 μm.

A cured product obtained by curing the same components as those of the elastic microparticles 3 had a JIS A hardness of 75, a strength of 35 MPa, and an elongation of 250%.

Examples 1 to 5 and Comparative Example 1

Components shown in Table 1 below were blended at the proportions (part by mass) shown in Table 1 below.

Specifically, a master batch was obtained by first kneading the components shown in Table 1 below, except the sulfur and the vulcanization accelerator, by a 1.7-L sealed mixer for 5 minutes, and then discharging the kneaded product when the temperature reached 150° C.

Next, a rubber composition was obtained by kneading the sulfur and the vulcanization accelerator with the obtained master batch using an open roll.

A vulcanized rubber sheet was then produced by vulcanizing the obtained rubber composition at 170° C. for 10 minutes in a mold for Lambourn abrasion (disk having a diameter of 63.5 mm and a thickness of 5 mm).

Modulus

The vulcanized rubber sheet produced as described above was cut into a dumbbell specimen JIS No. 3 (thickness: 2 mm) and 100% modulus (M100) and 300% modulus (M300) were measured under conditions of a temperature of 20° C. or 100° C. and a tensile speed of 500 mm/min in accordance with JIS K6251:2010. These results are shown in Table 1 below.

100% modulus at a temperature of 20° C. was evaluated as rigidity of a formed tire.

Tensile Strength

The vulcanized rubber sheet produced as described above was cut into a dumbbell specimen JIS No. 3 (thickness: 2 mm) and strength at break (TB) was measured in accordance with JIS K6251:2010 under conditions of a temperature of 20° C. or 100° C. and a tensile speed of 500 mm/min. These results are shown in Table 1 below.

Elongation

The vulcanized rubber sheet produced as described above was cut into a dumbbell specimen JIS No. 3 (thickness: 2 mm) and elongation at break (EB) was measured under conditions of a temperature of 20° C. or 100° C. and a tensile speed of 500 mm/min in accordance with JIS K6251:2010. These results are shown in Table 1 below.

tan δ (20° C.)

The obtained vulcanized rubber sheet was measured for the tan δ using a viscoelastic spectrometer (manufactured by Toyo Seiki Seisaku-sho, Ltd.) under conditions of an initial strain of 10%, an amplitude of ±2%, a frequency of 20 Hz, and a temperature of 20° C. in accordance with JIS K6394: 2007. The results are shown in Table 1 below.

Rolling Resistance Index Value

The obtained vulcanized rubber sheet was measured for the tan δ using a viscoelastic spectrometer (manufactured by Toyo Seiki Seisaku-sho, Ltd.) under conditions of an initial strain of 10%, an amplitude of ±2%, a frequency of 20 Hz, and a temperature of 60° C. in accordance with JIS K6394: 2007.

The obtained results are shown in Table 1 as index values with a value for Comparative Example 1 taken as 100. Smaller index values indicate less tan δ, and superior (smaller) rolling resistance.

Wear Resistance

The vulcanized rubber sheet produced as described above was measured for the abrasion loss using a Lambourn abrasion tester (manufactured by Iwamoto Seisakusho) under conditions of a temperature of 20° C. and at a slip ratio of 50% in accordance with JIS K6264-1 2:2005. The results are shown in Table 1 below.

TABLE 1

|  | Comparative Example 1 | Examples | | | | |
| --- | --- | --- | --- | --- | --- | --- |
|  |  | 1 | 2 | 3 | 4 | 5 |
| SBR | 100 | 100 | 100 | 100 | 100 | 100 |
| Silica | 80 | 70 | 80 | 80 | 80 | 80 |
| Elastic microparticles 1 | 0 | 10 | 10 | 20 |  |  |
| Elastic microparticles 2 |  |  |  |  | 20 |  |
| Elastic microparticles 3 |  |  |  |  |  | 20 |
| Silane coupling agent | 5 | 5 | 5 | 5 | 5 | 5 |
| Zinc oxide | 3 | 3 | 3 | 3 | 3 | 3 |
| Sulfur | 2.5 | 2.5 | 2.5 | 2.5 | 2.5 | 2.5 |
| Vulcanization accelerator | 1.5 | 1.5 | 1.5 | 1.5 | 1.5 | 1.5 |
| Anti-aging agent | 2 | 2 | 2 | 2 | 2 | 2 |
| M100(MPa) 20° C. | 2.2 | 2.4 | 2.6 | 3.2 | 2.8 | 3.1 |
| M300(MPa) 20° C. | 10.2 | 11.8 | 12.5 | 15.0 | 14.1 | 14.6 |
| TB(MPa) 20° C. | 20.2 | 19.6 | 19.3 | 19.5 | 19.8 | 19.7 |
| EB(%) 20° C. | 500 | 440 | 420 | 400 | 420 | 415 |
| M100(MPa) 100° C. | 2.4 | 2.6 | 2.5 | 3.9 | 3.3 | 3.5 |
| M300(MPa) 100° C. | 9.3 | 9.0 | 9.0 | 9.0 | 8.9 | 9.0 |
| TB(MPa) 100° C. | 10.1 | 9.0 | 9.0 | 9.0 | 8.9 | 9.0 |
| EB(%) 100° C. | 325 | 300 | 300 | 300 | 300 | 300 |
| Tanδ(20° C.) | 0.27 | 0.28 | 0.33 | 0.30 | 0.29 | 0.30 |
| Rolling resistance (index value) | 100 | 98 | 103 | 98 | 97 | 96 |
| Wear resistance | 113 | 110 | 105 | 112 | 107 | 105 |

The components shown in Table 1 are as follows.

SBR: Styrene-butadiene rubber (Nipol 1502, manufactured by Zeon Corporation)

Silica: Nipsil AQ (manufactured by Nippon Silica Industrial Co., Ltd.)

Elastic microparticles 1 to 3: produced as described above

Silane coupling agent: Silane coupling agent (Si69, manufactured by Evonik Degussa)

Zinc oxide: Zinc Oxide #3 (manufactured by Seido Chemical Industry Co., Ltd.)

Sulfur: Oil-treated sulfur (manufactured by Hosoi Chemical Industry Co., Ltd.)

Vulcanization accelerator: Sulfenamide-based vulcanization accelerator (Sanceller CM-G, manufactured by Sanshin Chemical Industry Co., Ltd.)

Anti-aging agent: Amine-based anti-aging agent (Santflex 6PPD, manufactured by Flexsys)

As shown from the results shown in Table 1, the rubber compositions of Examples 1 to 5 in which the elastic microparticles were mixed had large 300% modulus at 20° C., and had rigidity higher than the rubber composition of Comparative Example 1 in which elastic microparticles were not mixed.

Further, the wear resistance of the rubber compositions of Examples 1 to 5 in which the elastic microparticles were compounded was better than that in Comparative Example 1 in which the elastic microparticles were not compounded.

REFERENCE SIGNS LIST

1 Bead portion
2 Sidewall portion
3 Tire tread portion
4 Carcass layer
5 Bead core
6 Bead filler
7 Belt layer
8 Rim cushion

The invention claimed is:

1. A tire rubber composition comprising 100 parts by mass of a diene rubber (A) and from 1 to 50 parts by mass of elastic microparticles (B), wherein the elastic microparticles (B) have a form of microparticles obtained by crosslinking a crosslinkable oligomer or polymer (b1) in water or an organic solvent or in the diene rubber (A), and have an average particle size of from 0.001 to 100 μm, the JIS A hardness of a cured product obtained by crosslinking the crosslinkable oligomer or polymer (b1) without use of water, the organic solvent or the diene rubber (A) is greater than 45, and the elongation of the cured product is 200% or greater, the crosslinkable oligomer or polymer (b1) is a polyether-based, polyester-based, polyolefin-based, polycarbonate-based, aliphatic, saturated hydrocarbon-based, acrylic, plant-derived or siloxane-based polymer or copolymer, the crosslinkable oligomer or polymer (b1) has at least one crosslinkable functional group selected from the group consisting of a hydroxyl group, a hydrolyzable silyl group, a silanol group, an isocyanate group, a (meth)acryloyl group, an allyl group, a carboxy group, an acid anhydride group, and an epoxy group, and the elastic microparticles (B) have at least one selected from the group consisting of a mercapto group and a sulfide bond on the surface of the elastic microparticles (B).

2. The tire rubber composition according to claim 1, wherein the microparticles (B) have a composite structure composed of a component compatible with the diene rubber (A) and a component incompatible with the diene rubber (A).

3. The tire rubber composition according to claim 2, further comprising a carbon black and/or a white filler (C) in an amount of from 1 to 100 parts by mass per 100 parts by mass of the diene rubber (A).

4. The tire rubber composition according to claim 2, wherein the elastic microparticles (B) are microparticles obtained by crosslinking the crosslinkable oligomer or polymer (b1) in a dispersion including water or the organic solvent as a dispersion medium, removing the dispersion medium, and forming a powder.

5. The tire rubber composition according to claim 2, wherein the elastic microparticles (B) are microparticles obtained by crosslinking the crosslinkable oligomer or polymer (b1) in the diene rubber (A).

6. The tire rubber composition according to claim 1, further comprising a carbon black and/or a white filler (C) in an amount of from 1 to 100 parts by mass per 100 parts by mass of the diene rubber (A).

7. The tire rubber composition according to claim 6, wherein the elastic microparticles (B) are microparticles obtained by crosslinking the crosslinkable oligomer or polymer (b1) in a dispersion including water or the organic solvent as a dispersion medium, removing the dispersion medium, and forming a powder.

8. The tire rubber composition according to claim 6, wherein the elastic microparticles (B) are microparticles obtained by crosslinking the crosslinkable oligomer or polymer (b1) in the diene rubber (A).

9. The tire rubber composition according to claim 1, wherein the elastic microparticles (B) are microparticles obtained by crosslinking the crosslinkable oligomer or polymer (b1) in a dispersion including water or the organic solvent as a dispersion medium, removing the dispersion medium, and forming a powder.

10. The tire rubber composition according to claim 9, wherein the elastic microparticles (B) are microparticles obtained by crosslinking the crosslinkable oligomer or polymer (b1) in the diene rubber (A).

11. The tire rubber composition according to claim 1, wherein the elastic microparticles (B) are microparticles obtained by crosslinking the crosslinkable oligomer or polymer (b1) in the diene rubber (A).

12. A pneumatic tire comprising a tire tread formed using the tire rubber composition described in claim 1.

13. A pneumatic tire comprising a tire tread formed using the tire rubber composition described in claim 2.

14. A pneumatic tire comprising a tire tread formed using the tire rubber composition described in claim 6.

* * * * *